3,366,696
PREPARATION OF MENTHOLS FROM 3-p-MENTHENE VIA BORON COMPLEX
Daniel Lerner, Clifton, N.J., and Basilio Pispisa, Naples, Italy, assignors to Colgate-Palmolive Company, New York, N.Y., a corporation of Delaware
No Drawing. Filed Oct. 17, 1963, Ser. No. 317,081
5 Claims. (Cl. 260—631)

This invention relates to a procedure for forming menthols including racemic menthols and isomenthol, wherein a higher ratio of racemic menthol to isomenthol is realized.

Menthols can be prepared by a relatively simple two-stage process. In the initial stage, an inexpensive hydrocarbon such as limonene is catalytically disproportionated to 3-p-menthene in the presence of a transition metal oxide at 250° C.–350° C. In the second stage of the process, 3-p-menthene is reacted with a diborane in the presense of ethyl ether solvent at a temperature between about 0° C. and about −70° C., to form a menthene-boron complex, and the complex is thereafter reacted (deborated) with alkali and hydrogen peroxide in the presence of a solvent, particularly ethyl ether, in order to form the reaction product. The latter comprises racemic menthol, isomenthol and menthones. Characteristic of this process is the ratio of racemic menthol to isomenthol, namely, that the two so mentioned are found in substantially a 1:1 ratio. Naturally, since the racemic menthol commands a much higher market price and is more in demand, it would be well to increase the proportion of racemic menthol to isomenthol in this process.

It is an object of this invention to improve the ratio of racemic menthol to isomenthol in a process such as referred to above. Other objects of the invention will appear from the following description.

It has now been found that a much more advantageous ratio of racemic menthol to isomenthol can be obtained by using a co-solvent, by rapidly conducting the deboration reaction at a temperature between about 50° C. and about 80° C., preferably between 65 and 75° C.

A co-solvent found to be particularly advantageous with the solvents normally used in the deboration reaction, is ethyl alcohol. It is to be understood that other co-solvents in which both ethers and water are substantially soluble can also be used; representative are methyl, propyl, isopropyl and butyl alcohols, lower ketones, aldehydes and organic acids.

As indicated, the deboration reaction is carried out herein at a higher temperature and with a lesser reaction time than used hitherto. The reaction temperature will range between about 50 and about 80° C., with preference being given to the approximate range of 65–75° C., and with particular preference accorded to a temperature of the order of 70° C.

The invention is illustrated in detail by the following example, it being understood that the invention is not limited in any sense thereto.

Example

Diborane was prepared by reacting 10.6 grams of boron trifluoride etherate in 14.5 ml. of diethyleneglycoldimethyl ether with 1.65 grams of sodium borohydride in 32 ml. of diethyleneglycoldimethyl ether. The diborane was bubbled along with a dry nitrogen stream into a solution of 15.12 grams of 63 percent 3-p-menthene (9.55 grams of pure 3-p-menthene) in 35.5 ml. of dry ether, for about 2 hours, while the temperature was maintained at about 0° C. The resulting mixture was allowed to stand for 1 hour at room temperature (about 22° C.). Small pieces of ice were added to the mixture, and these were followed by 21 ml. of a saturated solution of sodium hydroxide in ethyl alcohol and 14 ml. of 30 percent hydrogen peroxide. During the addition of the alkali and peroxide, the temperature of the mixture rose to about 70° C. The resulting mixture was maintained at this temperature for about 15–20 minutes. An organic layer and an aqueous layer formed. The organic layer was separated. The aqueous layer was washed with ether. The combined organic layer and ether extracts were dried over anhydrous sodium sulfate, and the ether was evaporated. The residue was analyzed by vapor phase chromatography. The residue contained 2.5 parts of racemic menthol to one part of isomenthol. This is in contrast to the 1:1 ratio generally found in the process referred to above.

The present invention has been described with reference to the illustrative example and conditions; however, it will be appreciated by those skilled in the art that other variations and modifications of this invention can be employed without departing from the principle thereof. Thus, it will be understood that the invention is not limited to the particular compounds set forth in the illustrative discussion. It is intended in the appended claims to cover all such variations and modifications.

We claim:

1. A process for forming menthols which comprises reacting 3-p-menthene with a diborane in the presence of an ethereal solvent to form a boron complex of said 3-p-menthene, and thereafter rapidly converting said complex to a mixture of racemic menthols and isomenthol by deborating said complex with alkali and hydrogen peroxide at a temperature between about 50° C. and 80° C. and in the presence of a co-solvent in which both ethers and water are substantially soluble, said co-solvent being selected from the group consisting of alcohols having from 1–4 carbon atoms, lower alkanones, alkanals, and alkanoic acids, thereby obtaining a substantially higher ratio of racemic menthol to isomenthol than is obtained in the absence of the co-solvent.

2. A process for forming menthols which comprises reacting 3-p-menthene with a diborane in the presence of an ethereal solvent to form a boron complex of said 3-p-menthene, and thereafter rapidly converting said complex to a mixture of racemic menthols and isomenthols by deborating said complex with alkali and hydrogen peroxide at a temperature between about 50° C. and 80° C. and in the presence of ethyl alcohol as a co-solvent for said ethereal solvent and water, thereby obtaining a substantially higher ratio of racemic menthol to isomenthol than is obtained in the absence of said ethyl alcohol.

3. A process for forming menthols which comprises reacting 3-p-menthene with a diborane in the presence of an ethereal solvent to form a boron complex of said 3-p-menthene, and thereafter rapidly converting said complex to a mixture of racemic menthols and isomenthol by deborating said complex with alkali and hydrogen peroxide in the presence of a co-solvent in which both said ethereal solvent and water are substantially soluble, said co-solvent being an aliphatic organic compound selected from the group consisting of lower alkanols, alkanones, alkanals, and alkanoic acids, thereby obtaining a substantially higher ratio of racemic menthol to isomenthol than is obtained in the absence of the co-solvent.

4. A process for forming menthols which comprises converting (3-p-menthene) triborane to a mixture of racemic menthol and isomenthol by deborating said triborane with alkali and hydrogen peroxide at a temperature between about 50° C. and 80° C. and in the presence of an ethereal solvent and a co-solvent for said ethereal solvent and water said co-solvent comprising a lower aliphatic alcohol having from 1–4 carbon atoms, thereby obtaining a considerably higher ratio of racemic menthol to isomenthol than is obtained in the absence of said alcoholic co-solvent.

5. A process for forming menthols which comprises deborating (3-p-menthene) triborane with alkali and hydrogen peroxide in the presence of ethyl ether and ethyl alcohol at a temperature in the range of 65–75° to form an organic phase and an aqueous phase, separating said phases, and recovering therefrom a mixture of menthols in which the ratio of racemic menthol to isomenthol is greater than 1:1.

References Cited

UNITED STATES PATENTS 2,866,826  12/1958  McLaughlin et al. ____ 260—631
3,060,244  10/1962  Saegebarth _____ 260—606.5 X

OTHER REFERENCES

Brown et al. J. Am. Chem. Soc. vol. 81, p. 247 (1959).
Gerrard. The Organic Chemistry of Boron, 1961, pp. 152–8.
Wetherill, J. Org. Chem., vol. 22, pp. 1136–7 (September 1957).

LEON ZITVER, *Primary Examiner.*

DANIEL D. HORWITZ, *Examiner.*

D. P. CLARKE, T. G. DILLAHUNTY,
*Assistant Examiners.*